(12) United States Patent
Albano et al.

(10) Patent No.: US 7,110,237 B2
(45) Date of Patent: Sep. 19, 2006

(54) APPARATUS AND METHOD TO REDUCE STATIC CHARGE ON REMOVABLE MEDIA

(75) Inventors: Thomas Albano, Churchville, NY (US); Felix Aponte, Rochester, NY (US); Michael J. Hosey, Spencerport, NY (US); Arden B. Smith, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/837,188

(22) Filed: Apr. 30, 2004

(65) Prior Publication Data

US 2005/0002146 A1     Jan. 6, 2005

Related U.S. Application Data

(60) Provisional application No. 60/467,045, filed on May 1, 2003.

(51) Int. Cl.
*H05F 3/02*     (2006.01)
(52) U.S. Cl. ................. 361/220; 361/221; 361/212
(58) Field of Classification Search ............. 361/220, 361/221, 212; 439/951, 101, 607
See application file for complete search history.

(56) References Cited

U.S. PATENT DOCUMENTS

| | | | | |
|---|---|---|---|---|
| 5,171,480 | A * | 12/1992 | Yoshinaka et al. | 252/519.32 |
| 5,225,878 | A * | 7/1993 | Asano et al. | 399/167 |
| 5,398,154 | A * | 3/1995 | Perkins et al. | 361/212 |
| 5,508,879 | A * | 4/1996 | Kitamura et al. | 361/221 |
| 5,564,933 | A * | 10/1996 | Bouchan et al. | 439/76.1 |
| 5,828,918 | A * | 10/1998 | Abe et al. | 396/439 |
| 5,902,152 | A * | 5/1999 | Robert | 439/620 |
| 5,969,329 | A * | 10/1999 | Vallat | 235/475 |
| 6,955,551 | B1 * | 10/2005 | Yamamoto | 439/181 |

FOREIGN PATENT DOCUMENTS

| | | | |
|---|---|---|---|
| JP | 10320509 | * | 12/1998 |
| JP | 085090 A | * | 9/1999 |

\* cited by examiner

*Primary Examiner*—Brian Sircus
*Assistant Examiner*—Z Kitov
(74) *Attorney, Agent, or Firm*—Susan L. Parulski

(57) ABSTRACT

An imaging device, including a reader adapted to receive a removable memory device, the reader having an opening through which to receive the removable memory device; and a static discharge device disposed proximate the opening such that the removable memory contacts the static discharge device prior to being received through the opening, the static discharge device being electrically grounded.

4 Claims, 9 Drawing Sheets

APPARATUS AND METHOD TO REDUCE STATIC CHARGE ON REMOVABLE MEDIA

CROSS REFERENCE TO RELATED APPLICATION

Reference is made to and priority claimed from U.S. Provisional Application Ser. No. 60/467,045, filed May 1, 2003, entitled APPARATUS AND METHOD TO REDUCE STATIC CHARGE ON REMOVABLE MEDIA.

FIELD OF THE INVENTION

The invention relates generally to the field of digital data and digital imaging.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
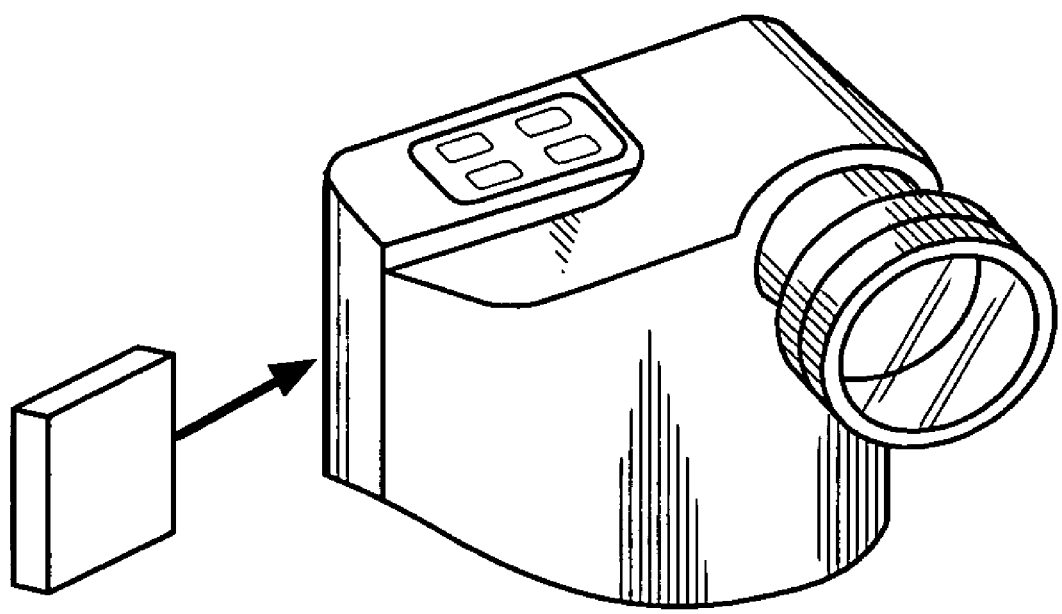
FIG. 1 shows an exemplary digital camera.

The following is a detailed description of the preferred embodiments of the invention, reference being made to the drawings in which the same reference numerals identify the same elements of structure in each of the several figures.

The present invention relates to devices which employ removable medium. Those skilled in the art commonly use various terms to describe removable medium, such as removable media, transportable memory, removable memory, removable memory device, digital card, and digital disk. Examples of removable media include, but are not limited to a memory card, Sandisk memory card, floppy disk, compact flash card, compact disc, PictureCD, Smart Media card, memory stick, or other form of removable media used in transferring digital data.

Devices which employ removable media are well known, for example, including but not limited to, a digital camera, a film/digital hybrid camera, PDAs, cellular/mobile phones having image displays, minilabs, imaging devices, and a computer.

A digital camera is generally illustrated in FIG. 1.

Figure 2:
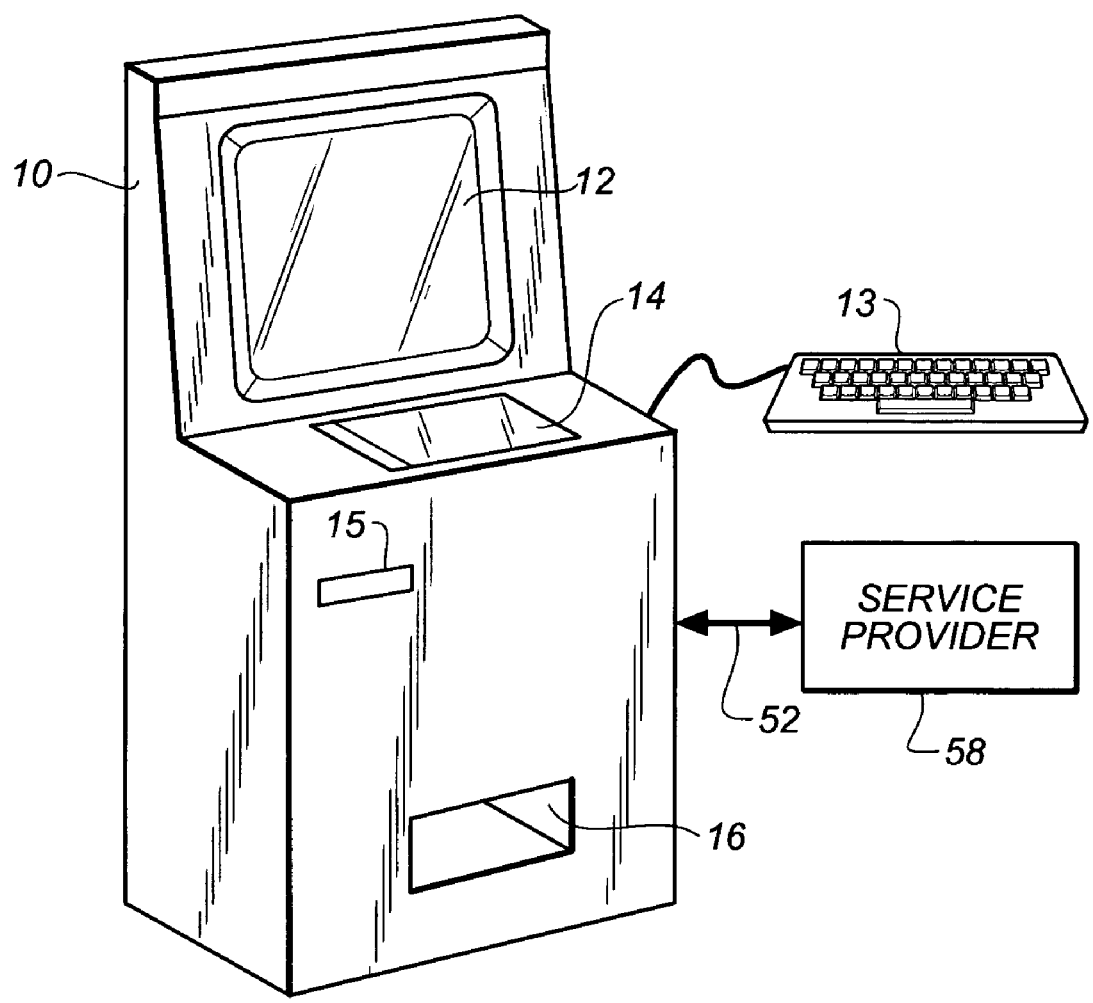
FIG. 2 shows an exemplary imaging device.

An example of an imaging device is a kiosk, such as a Picture Maker™ kiosk produced by Eastman Kodak Company, generally illustrated in FIG. 2.

Figure 3:
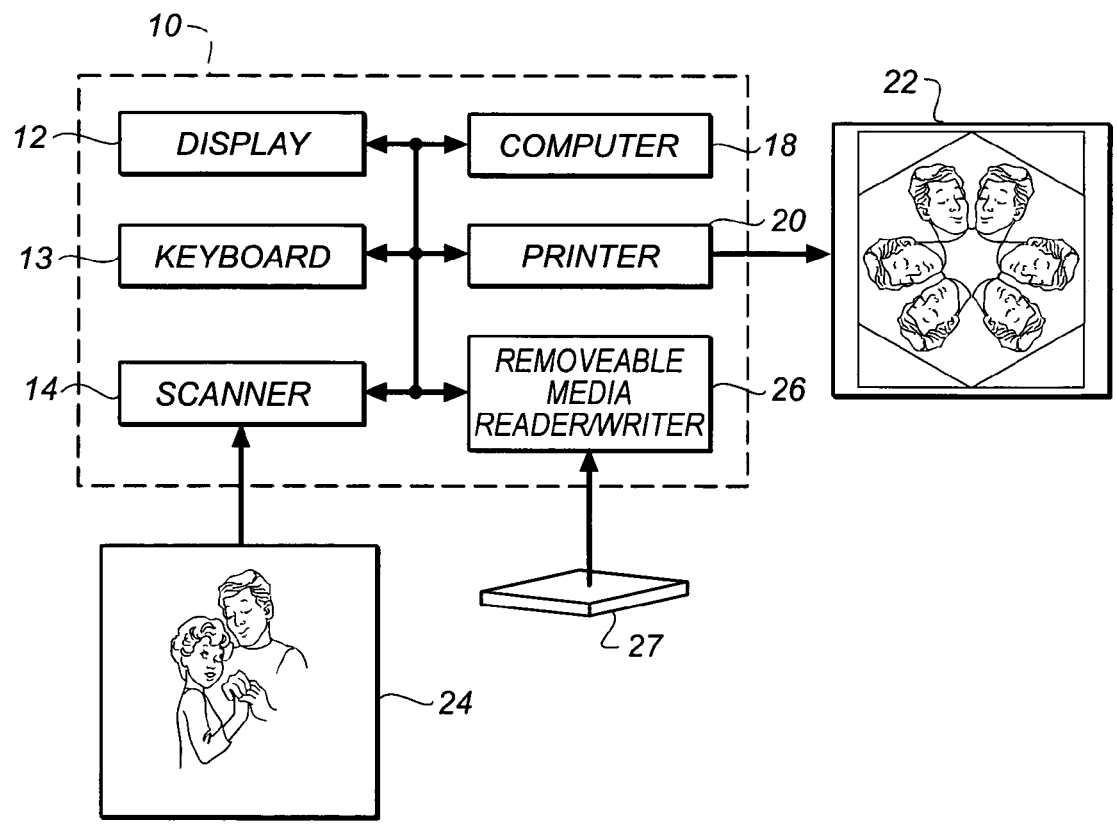
FIG. 3 shows a diagrammatic illustration of functions of the imaging device of FIG. 2.
Figure 4:
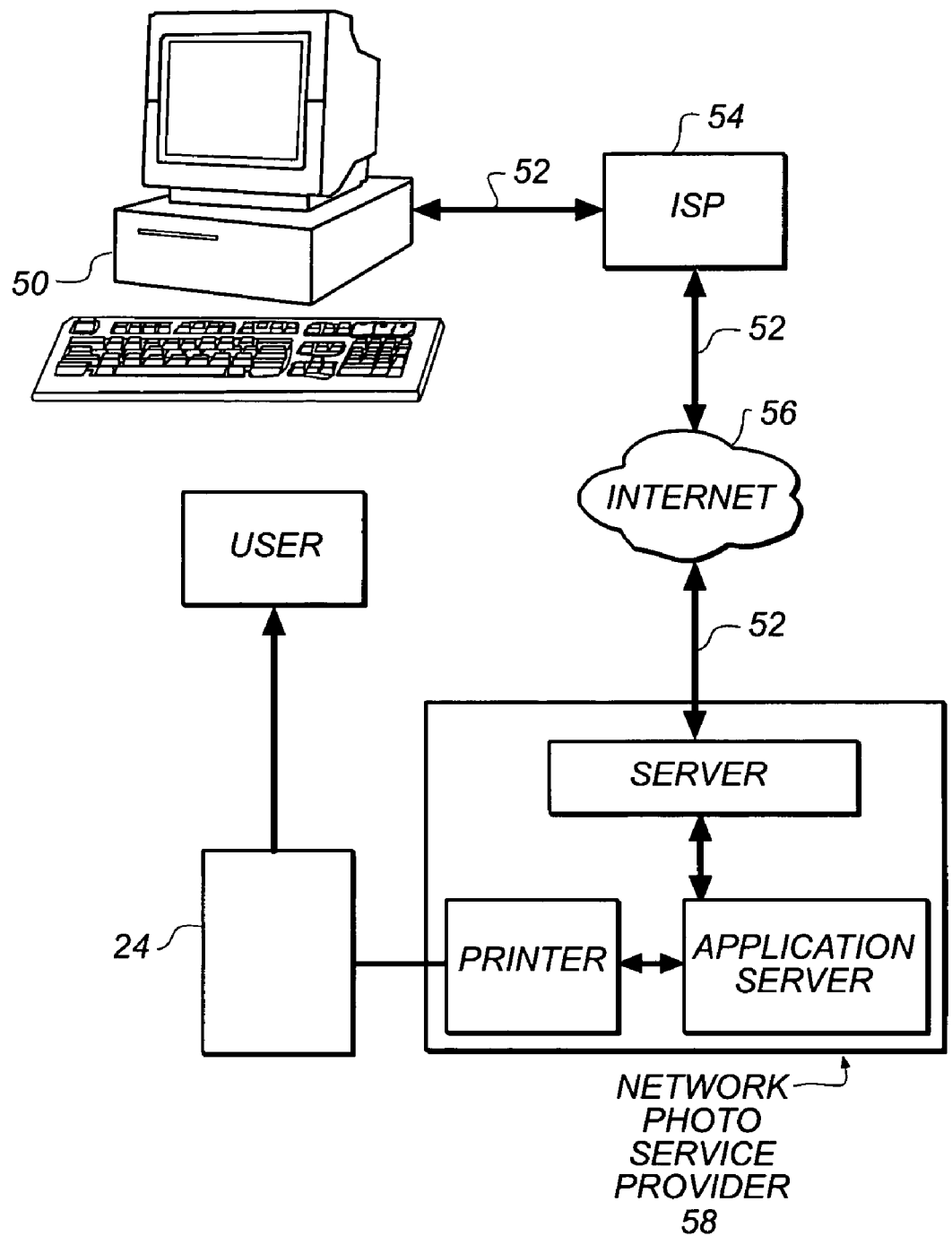
FIG. 4 shows a diagrammatic illustration of a system employing an imaging device of FIG. 2.

Referring now to FIGS. 2 through 4, an imaging device 10, configured as a kiosk, is generally illustrated in FIG. 2. Imaging device 10 includes a color display 12 for presenting information to a user. Color display 12 can be a touchscreen display, whereby a user can provide information and data to imaging device 10, or a keyboard 13 may be employed to provide information and data. A scanner 14 can be provided for receiving a user-supplied visual image and converting the visual image into digital form. Alternatively, an input port 15 can be provided for receiving a user-supplied visual image in digital form from a removable media, such as from a memory card, floppy disk, compact disc, PictureCD, or the like. Imaging device 10 can optionally include a delivery section 16 for controlling the delivery of a medium, for example, a hardcopy print. Delivery section 16 is illustrated in FIG. 2 as an opening in imaging device 10.

FIG. 3 generally shows a diagram of included functions of imaging device 10. As illustrated, imaging device 10 includes keyboard 13 for entering information/data into a computer 18. Computer 18 typically manages the flow of information and functionality of the components of imaging device 10. Imaging device 10 can optionally include a printer 20. Printer 20 responds to commands of computer 18 for forming an image on a medium such as thermal or ink-jet paper. An example of an output image is illustrated in FIG. 3 at 22 which was formed from a user-supplied visual image 24. As described above, another method of receiving user-supplied visual image 24 is illustrated by a removable media reader/writer 26 for receiving removable media 27, for example, a memory card, floppy disk, compact disc, PictureCD, or other form of removable media used in transferring digital files, or for transferring (i.e., writing) a fulfillment order (alone or in combination with the corresponding digital image) to removable media 27, whereby the removable media 27 is delivered/transferred to the photofinishing laboratory for processing of the fulfillment order.

It may be desired to transmit a fulfillment order from imaging device 10 to a service provider from which the service provider can store, print, the digital image. For example, if a consumer's fulfillment order includes a request for prints and imaging device 10 does not include a printer, the digital image can be transmitted to a service provider for fulfilling the fulfillment order. Accordingly, a communications network, generally shown in FIG. 2 at 52, provides a communication network for transmitting an image to a service provider 58. If imaging device 10 is a computer, such as a home or personal computer, a service provider can also be employed. For example, referring to FIG. 4, when employing a service provider, a computer 50, can be used as imaging device 10 for viewing the user's image 24. Communication network 52 for transmitting image 24 can be by means of an internet service provider (ISP) 54 and the internet 56 to a service provider 58.

Using imaging device 10, at least one digital image is accessed and displayed on display 12. Access and display of the images is accomplished using methods known to those skilled in the art. For example, as discussed above, means for accessing the images can be accomplished by scanning a hardcopy print or employing input port 15 to receive removable media 27. If imaging device 10 is a digital camera, the captured image can be displayed upon capture. Display 12 can provide instructions to the user for accessing the digital image.

Figure 5:
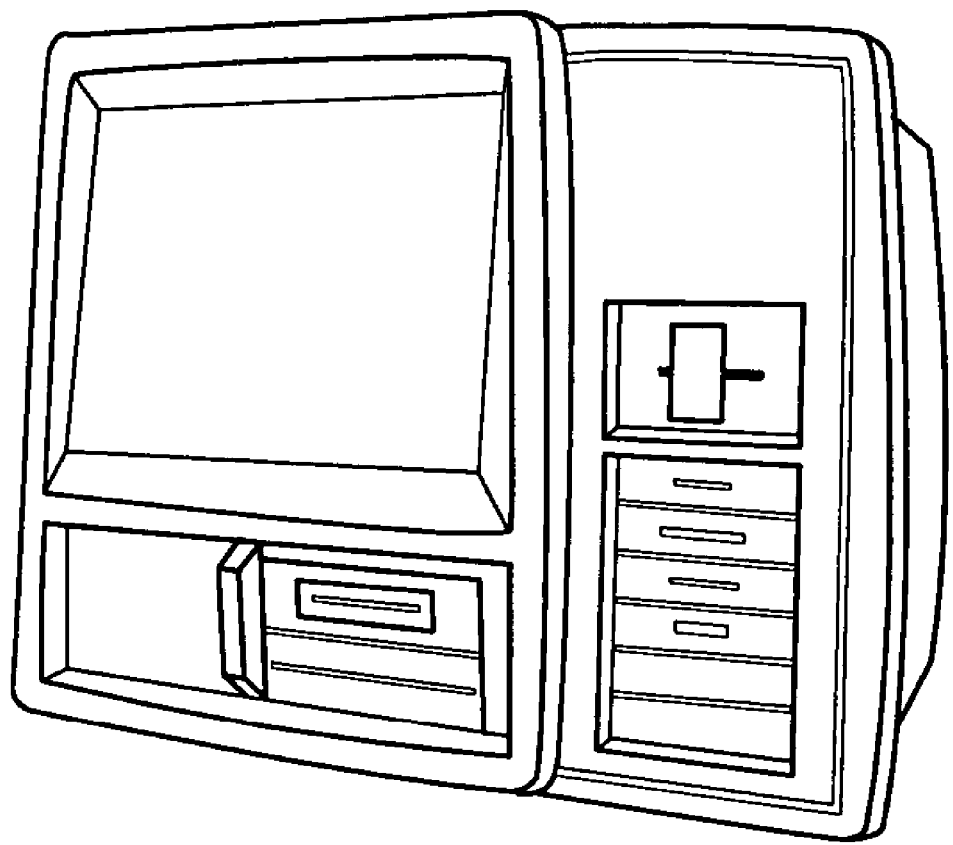
FIG. 5 shows a diagrammatic illustration of a plurality of readers for removable media in accordance with the present invention.

FIG. 5 shows a plurality of readers for removable media 27.

Static discharge, also commonly referred to as electrostatic discharge or ESD, is an everyday occurrence, as indicated by the attached articles titled HOW TO KEEP ESD OUT OF ELECTRONICS and ELECTOSTATIC DISCHARGE, both articles incorporated herein as part of this application.

A static charge can build up on the removable media. Such a charge can adversely affect the digital data on the removable media or the device which accepts/receives the removable media. Accordingly, there is a need to discharge the static charge prior to the electrical connection between the removable media and device.

Figure 6:
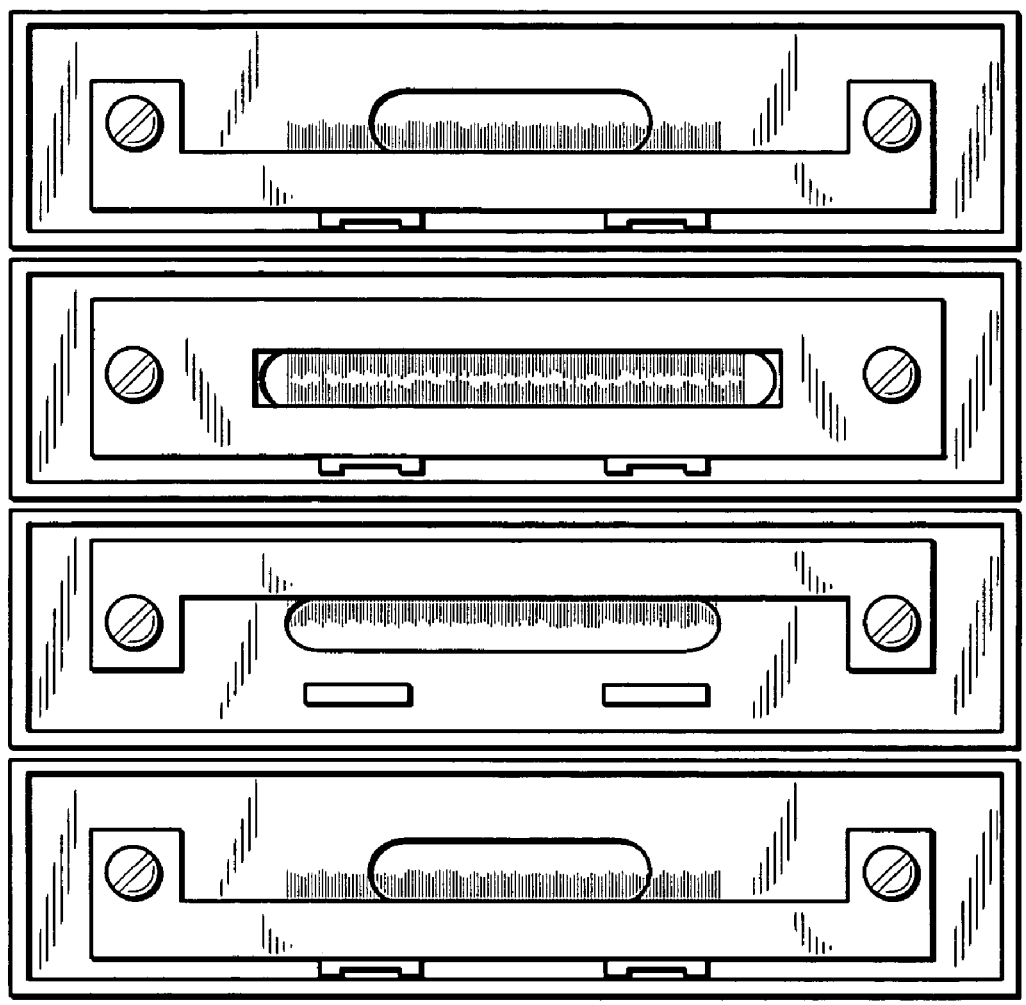
FIG. 6 shows a front diagrammatic illustration of a plurality of reader for removable media in accordance with the present invention.

The present invention employs a static discharge device to discharge (i.e., dissipate) the static charge disposed on the removable media prior to the removable memory making an electrical contact with the reader. In a preferred embodiment, the static/dissipation discharge device is a brush configuration disposed proximate the media reader (can also be referred to as a digital reader, memory card reader, removable media reader) for the removable media. FIG. 6 shows various brush configurations for, top to bottom, memory card, compact flash card, Smart Media card, and a memory stick. The discharge device could be a material such as an electrically conductive plush.

The brushes are disposed relative to the reader such that the removable media contacts the brushes prior to the removable media making electrical contact with the reader, that is, before an electrical connection is made.

In FIG. 5, the media readers are disposed inside the kiosk cabinet. The visible slots in the kiosk cabinet allow for access to the media readers.

Figure 7:
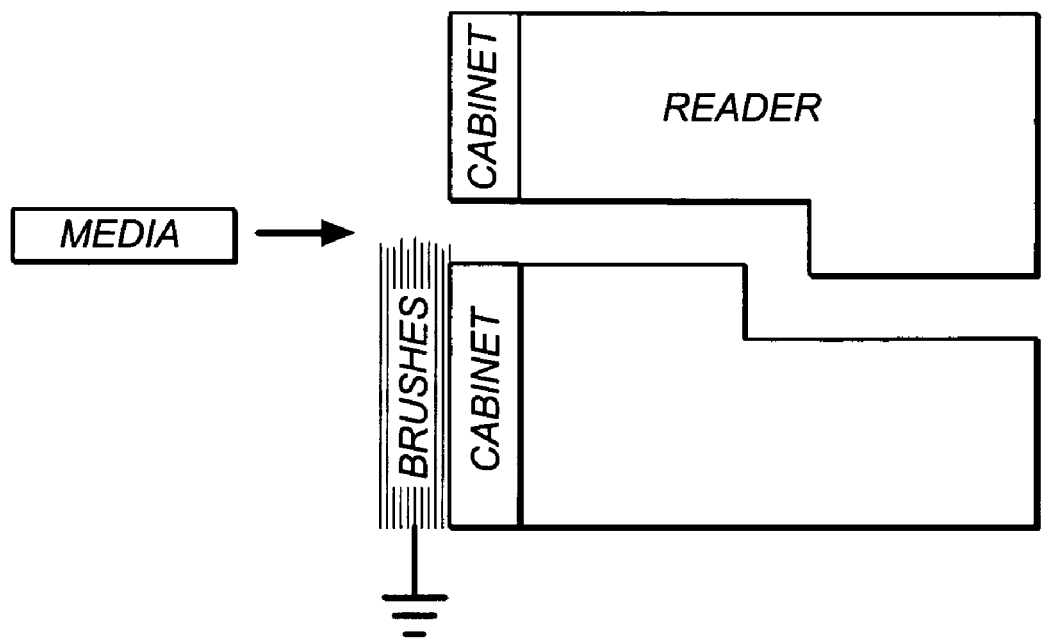
FIG. 7 shows a diagrammatic illustration of a discharge material relative to the reader in accordance with the present invention.
Figure 8:
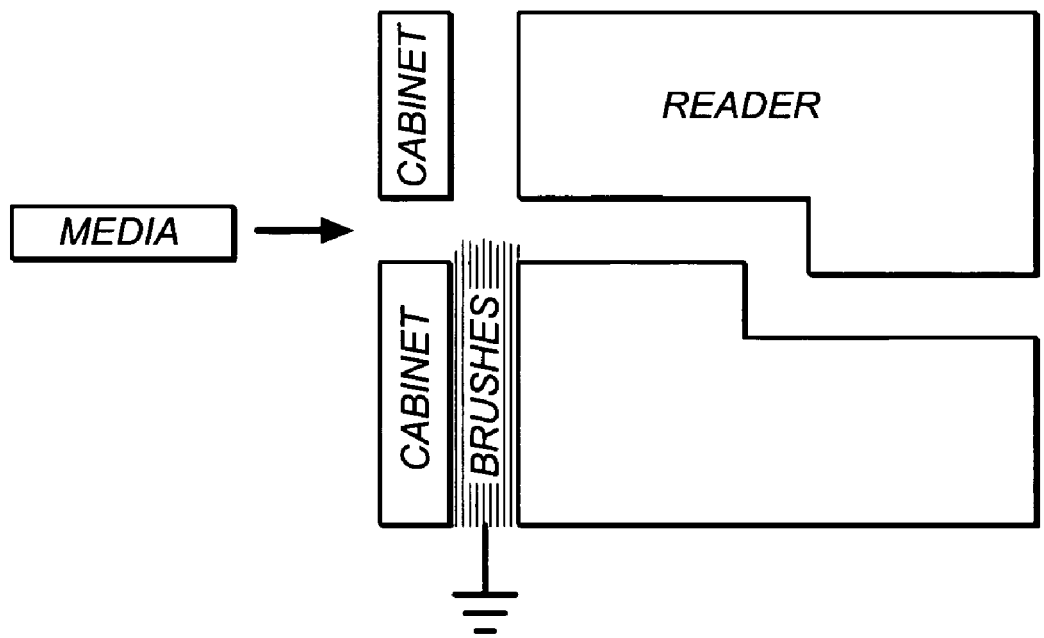
FIG. 8 shows a diagrammatic illustration of a discharge material relative to the reader in accordance with the present invention.
Figure 9A:
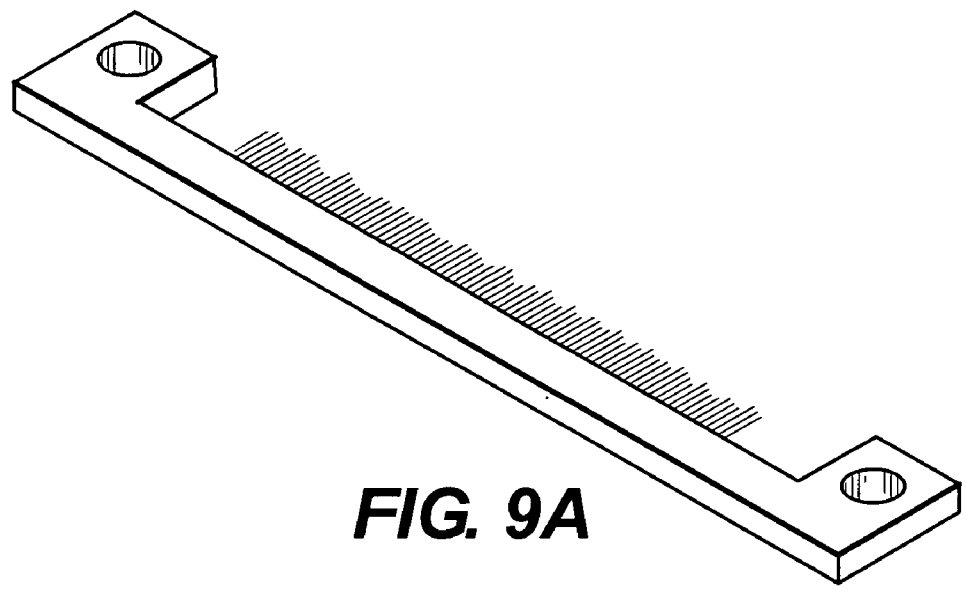
FIGS. 9A, 9B, and 9C show views of a brush arrangement in accordance with one embodiment of the present invention.
Figure 9B:
Figure 9C:
Figure 10A:
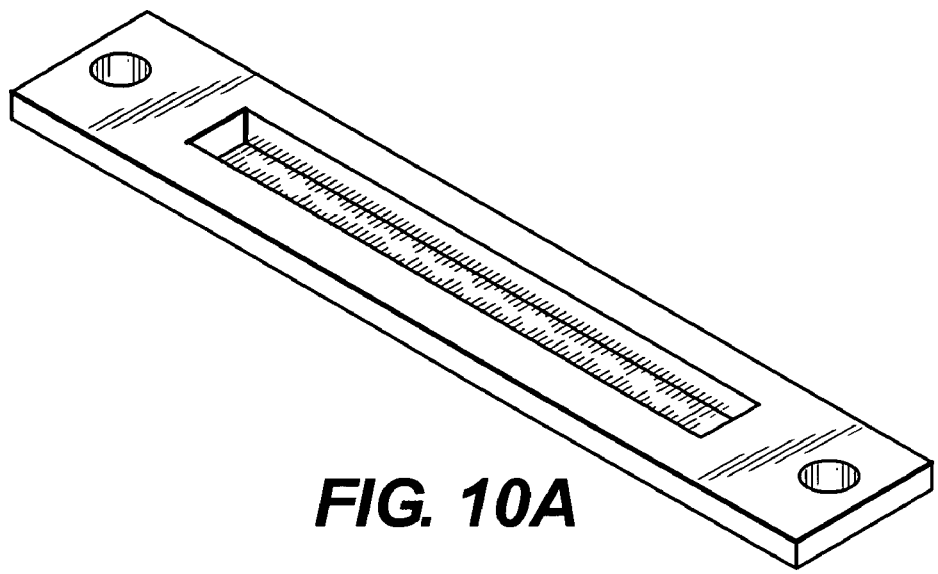
FIGS. 10A, 10B, and 10C show views of a brush arrangement in accordance with another embodiment of the present invention.
Figure 10B:
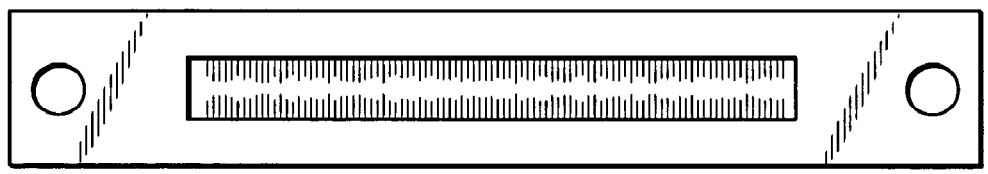
Figure 10C:

FIGS. 6 and 7 show the brushes on the outside of the kiosk cabinet. The brushes can be disposed on the inside of the kiosk cabinet so long as they are arranged such that the removable media contacts the brushes prior to the removable media making electrical contact with the reader. Refer to FIG. 8. That is, the brushes are disposed in the entry path to the reader, so that the removable media contacts the brushes when moving along the path to the ingress of the reader.

The charge on the removable media is reduced/eliminated when contact is made between the removable media and the brushes. The brushes are electrically grounded as shown in FIGS. 7 and 8 by means known to those skilled in the art to remove the charge.

The use of conductive brush configurations in conjunction with memory card readers to eliminate and or significantly reduce well-known adverse effects on memory card contents and electronic devices when subjected to the electrostatic discharges associated with the Human Body Model.

The present invention places an electrically grounded conductive brush material so as to ensure the appropriate interface(s) of a given media makes appropriate contact with the conductive brush material prior to electrical contact being made with the card-reading device. This ensures that the static buildup charge (charge capacitance or stored energy) on the card is dissipated via the appropriate resistive grounding path therefore eliminating the potential of a high voltage Electrostatic Discharge (ESD) event being induced via the connections of the electronic device or the conduction of said charge into the memory card electronics as well.

The placement of the conductive brush material needs to be orientated in a manner to ensure uniform contact on the appropriate interface(s) over the full extent of the length of the conductive interface of the memory card. The preferred embodiment is a high density packed conductive brush configuration to ensure constant and uniform contact.

While conductive brush material is varied—brass, nickel, carbon and stainless steel for example—the preferred embodiment is a brush material of copper sulfide or antimony tin oxide coated acrylic fibers. Thunderon® (from DuPont) is an example of such a multi-function fiber configuration.

There are many types of memory cards available today. Compact Flash, Smart Media, Memory Stick, xD-Picture, MMC, Secure Digital and PCMIA, just to name a few. Each type has different geometry and electrical connection interfaces. Accordingly this idea supports the implementation of the conductive brush configurations so as to ensure the appropriate conductive interfaces are engaged for each media/card reader type.

The brushes can be disposed on one side of the slot or both sides. If the removable media has metal on two sides, then it is preferred to have brushes on two sides of the slots. FIGS. 9A–9C and 10A–10C provide more details on the brush arrangement.

The brush material is preferably flexible so that the brush does not break when moved against, brushed by, contact the removable media. That is, the brushes have a low resistance. Also, preferred brush material is soft so that it does not scratch or harm the removable media.

Another brush material is an ATO suffused acrylic brush grounded to equipment chassis.

Accordingly, the present invention uses an electrostatic brush to reduce/eliminate the electrostatic charge that is inherent and/or built up on a camera card by a human being handling and transporting such card.

The apparatus/method of the present invention can be retro-fit to existing digital readers. As such, the present invention provides a relatively low cost method of improving the readability of camera cards in digital kiosk applications.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An imaging device, comprising:
   a reader disposed behind a cabinet and adapted to receive a removable memory device, the cabinet and reader having an opening through which to receive the removable memory device; and
   a static discharge brush disposed outside the opening in the cabinet and reader such that the removable memory device must first contact the static discharge brush outside the cabinet, before the removable media device can be inserted into the opening, for the static discharge brush to discharge static from the removable memory device outside the opening.

2. The imaging device of claim 1, wherein the static discharge brush is a high density packed conductive brush.

3. The imaging device of claim 2, wherein the conductive brush is copper sulfide or antimony tin oxide coated acrylic fibers.

4. The imaging device of claim 2, wherein the conductive brush is flexible and soft so as to be yielding in contact with the removable memory device.

* * * * *